Nov. 25, 1930.  S. J. GARDNER  1,782,846
CLAMP MACHINE
Filed July 24, 1930    2 Sheets-Sheet 1
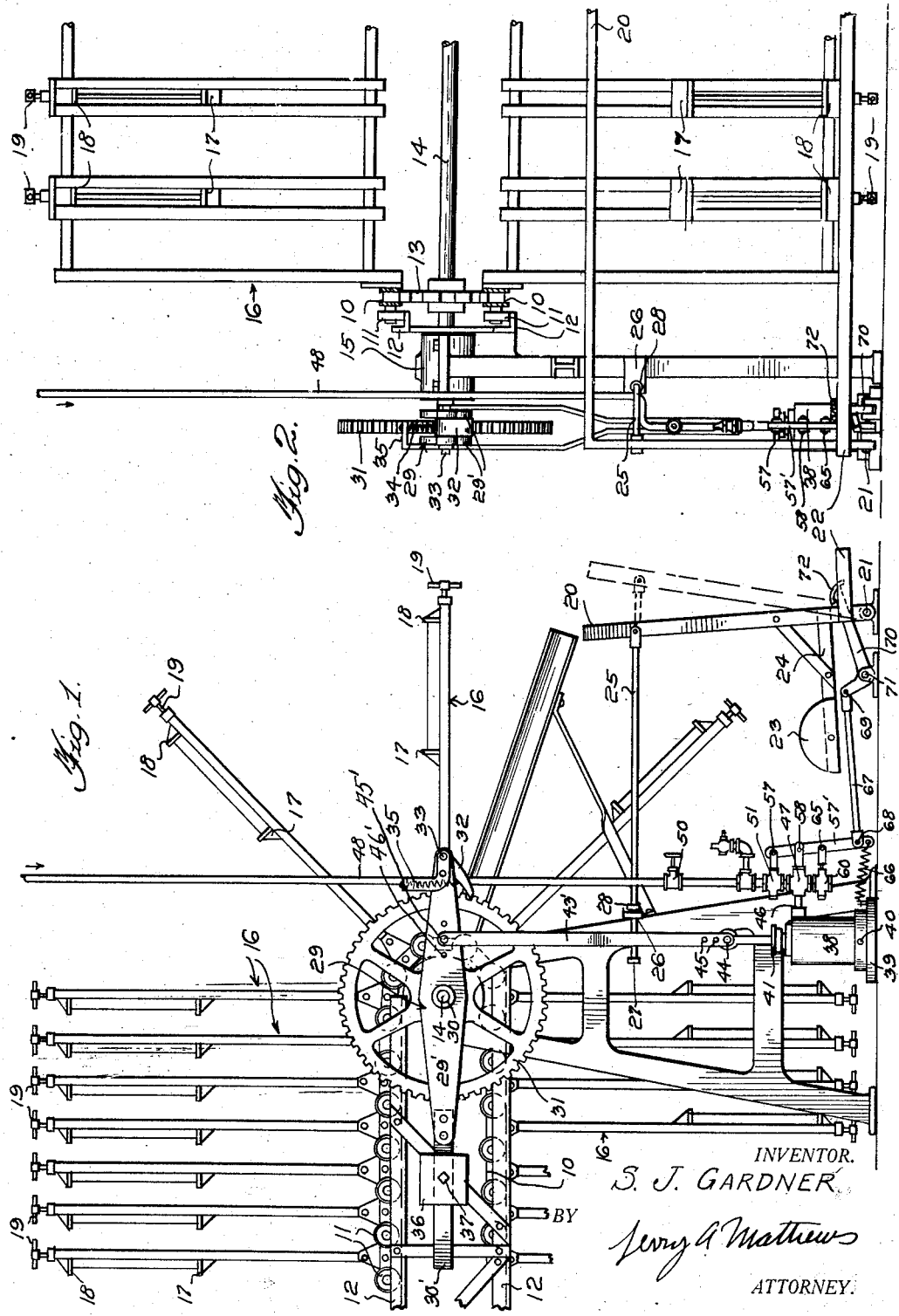
INVENTOR.
S. J. GARDNER
BY
Jerry G. Mathews
ATTORNEY.

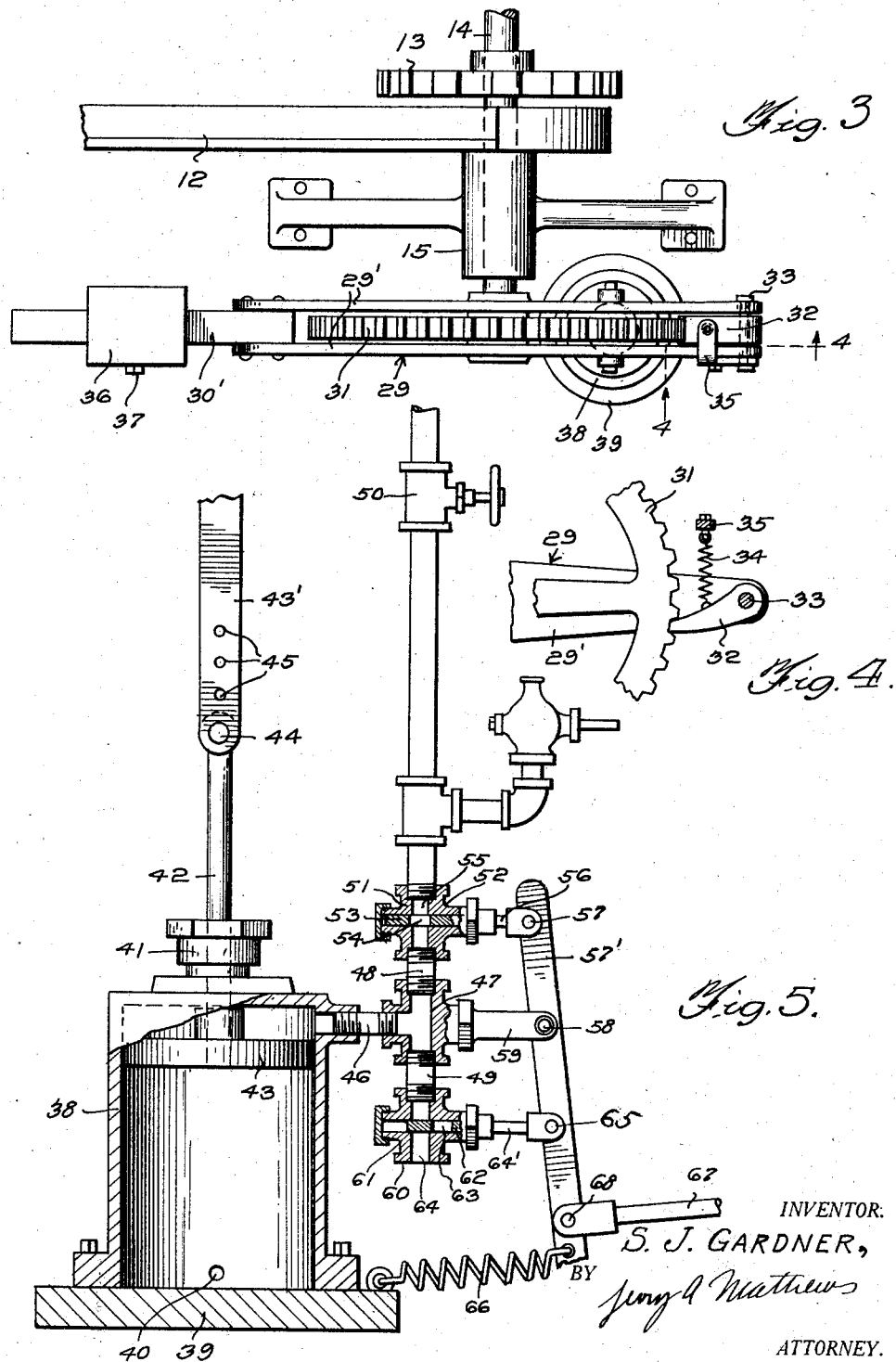

Patented Nov. 25, 1930

1,782,846

UNITED STATES PATENT OFFICE

STONEWALL J. GARDNER, OF NEW ALBANY, INDIANA

CLAMP MACHINE

Application filed July 24, 1930. Serial No. 470,518.

My invention relates to improvements in clamp machines, and has particular reference to means for effecting an intermittent movement of the clamps to the work position.

The clamp machine embodies generally a traveling support, preferably in the form of an endless structure carrying the clamps which hold glued work while the glue is setting or drying. The endless structure must be advanced to bring the clamps in succession to the work position, preferably resting upon a work support in which position the dried or set work is removed and the freshly glued work inserted within the clamps.

The present invention resides more particularly in means for intermittently advancing the movable carrier supporting the clamps. This advancing means is fluid pressure operated, and may be conveniently actuated by the workman standing near the support. The advancing means may be adjusted for regulating its speed of operation and may be also adjusted to regulate the extent of movement that it will apply to the traveling carrier. The arrangement is such that the traveling carrier may be manually operated independently of the advancing means, if desired. The advancing means is such that there is no liability of the machine injuring or destroying itself should it be improperly stopped by an obstruction. The advancing means relieves the workman of a great deal of work thereby enabling him to increase the output of the machine. The advancing means may be attached to standard types of clamping machines, without material alteration of the same.

In the accompanying drawings, forming a part of this specification, and in which like numerals are employed to designate like parts throughout the same, Figure 1 is a side elevation of one end of a clamp machine, showing my advancing means or attachment applied thereto, Figure 2 is an end elevation of the same, Figure 3 is a plan view of the operating lever and associated elements, Figure 4 is a detail section taken on line 4—4 of Figure 3, and, Figure 5 is a side elevation of the cylinder and associated elements.

The advancing means or attachment is adapted to be used upon different types of clamp machines, without material alteration of the same. For the purpose of illustration, I have shown the advancing means as applied to the clamp machine disclosed in United States Patent No. 1,420,941, issued to H. B. Palmer, under date of June 27, 1922.

This clamp machine embodies a traveling or endless carrier, including chains 10, having wheels or rollers 11 connected therewith, which travel upon upper and lower horizontal rails 12. These chains and rollers travel about toothed wheels 13, there being a pair of these toothed wheels at each end of the machine. These toothed wheels are carried by transverse shafts 14, journaled in suitable bearings 15, carried by the framework of the machine. The endless chains carry clamp frames 16 upon which are suitably mounted clamps, comprising stationary clamp elements 17 and adjustable clamp elements 18, actuated by screws 19. The clamp frames extend substantially vertically above the upper run of the chains and depend substantially vertically from the lower runs. When the clamp frames are passing around the toothed wheels 13 they assume angular radial positions, whereby they are suitably spaced, so that the workman may conveniently remove the dried stock from the clamps and insert freshly glued stock therein. When in the work position, the clamp frames are adapted to rest upon the top of a work support 20, pivoted at its lower end to swing in a vertical plane as shown at 21, and having an outwardly extending treadle 22 near its lower pivoted end. A weight 23 is carried by an arm 24, rigidly attached to the work support 20 and serving to shift it to the forward position in the path of travel of the clamp frames. A rod 25 is pivotally connected with the upper end of the work support and is slidable through an apertured bracket 26, and has stops 27 and 28 to limit the forward and rearward movement of the work support. The advancing means or attachment embodies a lever 29, preferably horizontally arranged when in the starting or idle position. This lever is provided between its ends with an opening 30 for pivotally receiving the shaft 14, which is connected with the traveling or endless carrier, to drive the same. This lever embodies a pair of spaced arms 29' having a rod 30' attached to the forward ends of the same. Disposed between the arms 29' is a toothed or ratchet wheel 31, having a pawl 32 pivoted to its rear end, as shown at 33, and this pawl is drawn upwardly into engagement with the toothed wheel 31, by a retractile coil spring 34, in turn attached to a bracket 35 secured to the lever 29. At its opposite end, the lever 29 has a weight 36, longitudinally adjustably mounted thereon, and adapted to be clamped in a selected adjusted position by a bolt 37 or the like. The lever 29 and associated elements is arranged near the end of the clamp machine, having the work support 20 as shown.

The numeral 38 designates a vertically arranged cylinder, held stationary upon a fixed base 39, and provided at its lower end with a breathing port 40. The upper end of the cylinder is closed and is equipped with a stuffing box 41, slidably receiving a piston rod 42, extending into the cylinder for connection with a piston 43. The piston rod 42 is attached to connecting rods 43' by means of a pin 44 or the like, for insertion within a selected one of the openings 45 arranged in a longitudinal row upon the connecting rods. These connecting rods extend upwardly and are pivotally connected with the lever 29 by a pin 45' adapted for insertion through a selected one of the openings 46', extending longitudinally of the lever 29. It is obvious that the distance between the center of the pin 45' and the pivot 14 of the lever may be varied by inserting the pin 45' in different openings 46', thus regulating the extent of turning movement of the lever 29 upon each downward stroke of the piston.

A fluid pressure supply pipe 46 leads into the top of the cylinder 38 above the piston and is connected with a T-coupling 47 having a fluid pressure supply pipe 48 connected in its upper end and an exhaust pipe 49 in its lower end. A master adjustable cut-off valve 50 is connected in the pipe 48. A reciprocatory inlet valve 51 is connected in the pipe 48 and embodies a valve casing 52 and a sliding valve element 53 having a port 54, for movement into and out of registration with the bore 55. The valve element 53 is connected with a stem 56, which is pivotally connected at 57, with the upper end of a vertically swinging lever 57', which is pivoted between its ends at 58, with a stationary support arm 59, attached to a T-coupling 47. An exhaust valve 60 is connected with the exhaust pipe 49 and embodies a casing 61 and a sliding valve element 62, having a port 63 for movement into and out of registration with the bore 64 of the valve casing. The valve element 62 is carried by a stem 64', which is pivoted at 65 with the lever 57'. At its lower end, the lever 57' has connection with a retractile coil spring 66, attached to the base 39. The spring 66 normally holds the lever 57' in a vertical position, at which time the inlet valve 51 is closed and the exhaust valve 60 open. A rod 67 is pivoted at 68 with the lower end of the lever 57' and extends rearwardly toward the work support for pivotal connection at 69 with a bell-crank-lever 70 which is pivoted at 71. This bell-crank-lever carries a treadle 72 by means of which the workman may depress the same by the foot, thereby swinging the lower end of the lever 57' rearwardly, opening the inlet valve 51 and closing the exhaust valve 52.

The operation of the machine is as follows:

When the workman desires to bring the next clamp frame to the work position, upon the work support, he depresses the treadle 72, which through the medium of bell-crank-lever 70 and associated elements, pulls the lower end of the lever 57' rearwardly, shifting the valve element 53 forwardly so that its port 54 registers with the bore 55, while the valve element 62 is moved rearwardly so that its port 63 is moved out of registration with the bore 64. The inlet valve is, therefore, opened and the exhaust valve closed. The fluid pressure, such as steam, compressed air, or any other suitable fluid under pressure, is thus fed into the top of the cylinder 38, above the piston 43, forcing the piston downwardly. This movement of the piston draws the connecting rods 43' downwardly and swings the rear end of the lever 29 downwardly, causing the pawl 32 to turn the toothed wheel 31 clockwise. The clamp frame is thereby advanced toward the work support and as soon as the clamp frame has reached the work support, the treadle 72 is released and the inlet valve closed and exhaust valve opened. The weight 36 will then restore the lever 29 and associated elements to the normal starting position. It is obvious that the stroke of the piston 43 defines the extent of movement that the same can impart to the toothed wheel 31 and this extent of movement can be regulated or adjusted, as described. The lever 29' is in radial alignment in succession with each clamp frame, when the lever is in the uppermost position, and retains the alignment throughout its downward movement, and thus travels throughout the same number of degrees as the clamp frame. When the lever is returned to the uppermost position, it again is in radial alignment with the next clamp frame. The advancing means is thus capable of imparting the correct intermittent feeding movement to the carrier, without liability of the machine injuring or destroying itself. The machine may still be manually operated, with the feeding means attached thereto, as the workman may manually draw the clamp frame downwardly, the toothed wheel 31, tripping upon the pawl 32.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:—

1. In a machine of the character described, a traveling clamp support, a toothed wheel to drive the same, a pivoted lever arranged near the wheel, a pawl carried by the lever to engage the toothed wheel, and fluid pressure operated means to move the lever.

2. In a machine of the character described, a traveling clamp support, pawl and ratchet means to drive the same, and fluid pressure operated means to actuate the pawl and ratchet means.

3. In a machine of the character described, a traveling clamp support, a toothed wheel to drive the same, a pivoted lever arranged near the toothed wheel, a pawl carried by the lever to engage the toothed wheel, a cylinder, a piston within the cylinder and connected with the lever, and means to supply and exhaust fluid pressure to and from the cylinder.

4. In a machine of the character described, a traveling clamp support, a toothed wheel to drive the same, a pivoted lever arranged near the toothed wheel, a pawl carried by the lever to engage the toothed wheel, a cylinder, a piston within the cylinder and connected with the lever, inlet and exhaust valves connected with the same end of the cylinder, manually operated means to alternately open one valve and close the other, and a weight connected with the lever to move the same in one direction.

5. In a machine of the character described, an endless traveling support, rotary supporting means for each end of the endless traveling support, clamps mounted upon the endless traveling support and disposed substantially vertically upon the upper and lower runs of the same and radially disposed at the rotary supporting means, a pivoted lever arranged near the rotary supporting means and movable independently of the same, said lever swinging with the selected clamp, pawl and ratchet means connecting the lever and the rotary supporting means, a cylinder, a piston within the cylinder and connected with the lever, and means to supply fluid pressure to the cylinder for moving the piston in one direction, the arrangement being such that the stroke of the piston will move the lever sufficiently to shift the clamp to the work position.

In testimony whereof I affix my signature.

STONEWALL J. GARDNER.